(12) United States Patent
Hilf et al.

(10) Patent No.: US 8,969,467 B2
(45) Date of Patent: Mar. 3, 2015

(54) MATERIALS HAVING A CONTROLLABLE DEGREE OF CROSSLINKING

(75) Inventors: Stefan Hilf, Rodenbach (DE); Friedrich Georg Schmidt, Haltern am See (DE); Christopher Barner-Kowollik, Stutensee (DE); Jiawen Zhou, Moers (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 13/988,147

(22) PCT Filed: Oct. 12, 2011

(86) PCT No.: PCT/EP2011/067752
§ 371 (c)(1),
(2), (4) Date: Jul. 26, 2013

(87) PCT Pub. No.: WO2012/065786
PCT Pub. Date: May 24, 2012

(65) Prior Publication Data
US 2013/0303678 A1    Nov. 14, 2013

(30) Foreign Application Priority Data

Nov. 17, 2010  (DE) .......................... 10 2010 044 025

(51) Int. Cl.
| | | |
|---|---|---|
| C08L 33/08 | (2006.01) | |
| C09D 11/00 | (2014.01) | |
| C09J 133/08 | (2006.01) | |
| C09D 133/08 | (2006.01) | |
| C08F 2/60 | (2006.01) | |
| C08J 3/24 | (2006.01) | |

(52) U.S. Cl.
CPC . *C08L 33/08* (2013.01); *C08F 2/60* (2013.01); *C08J 3/243* (2013.01); *C08J 3/246* (2013.01); *C09D 11/00* (2013.01); *C09D 133/08* (2013.01); *C09J 133/08* (2013.01)
USPC .......................................... 524/518; 525/210

(58) Field of Classification Search
CPC .......... C08F 8/00; C08L 33/08; C09J 133/08; C09D 11/00; C09D 133/08
USPC ............ 524/560, 577, 518; 525/330.5, 333.6, 525/210
See application file for complete search history.

(56) References Cited

U.S. PATENT DOCUMENTS

| 4,316,978 | A  | * | 2/1982 | Kennedy et al. ............ 526/348.7 |
|---|---|---|---|---|
| 6,512,051 | B2 | * | 1/2003 | Chino et al. .................. 525/203 |
| 2007/0055018 | A1 | | 3/2007 | Achten et al. |
| 2007/0148465 | A1 | * | 6/2007 | Shimura et al. ............ 428/411.1 |
| 2012/0289657 | A1 | | 11/2012 | Hilf et al. |
| 2012/0309895 | A1 | | 12/2012 | Schmidt et al. |
| 2013/0323993 | A1 | | 12/2013 | Schmitt et al. |
| 2014/0163165 | A1 | | 6/2014 | Schmidt et al. |

FOREIGN PATENT DOCUMENTS

EP            1 762 593         3/2007

OTHER PUBLICATIONS

Inglis et al. "Ultrafast Click Conjugation of Macromolecular Building Blocks at Ambient Temperature", vol. 48, Issue 13, 2411-2414, Mar. 16, 2009.*
Inglis et al. "Ultrafast Click Conjugation of Macromolecular Building Blocks at Ambient Temperature", Communications, vol. 48, Issue 13, 2411-2414, Mar. 16, 2009.*
U.S. Appl. No. 14/127,380, filed Dec. 18, 2013, Schmidt, et al.
International Search Report Issued Dec. 23, 2011 in PCT/EP11/67752 Filed Oct. 12, 2011.
U.S. Appl. No. 13/820,621, filed Mar. 4, 2013, Schmidt, et al.
U.S. Appl. No. 14/360,442, filed May 23, 2014, Schmidt, et al.
U.S. Appl. No. 14/363,055, filed Jun. 5, 2014, Schmidt, et al.

* cited by examiner

*Primary Examiner* — Michael M Bernshteyn
(74) *Attorney, Agent, or Firm* — Oblon, McClelland, Maier & Neustadt, L.L.P.

(57) ABSTRACT

The present invention relates to innovative materials which can be crosslinked by means of two different crosslinking mechanisms, the first crosslinking mechanism being an irreversible crosslinking. The second crosslinking mechanism is a thermoreversible mechanism.

As a result of this thermoreversible change in the arc length, properties of the crosslinked material can be decisively changed and controlled, including flexibility, elasticity and other mechanical properties, but also chemical properties, the gas permeability and vapor permeability and storage capacity of the network. In this way it would be possible, for example, to store energy sources such as fuels.

13 Claims, 1 Drawing Sheet

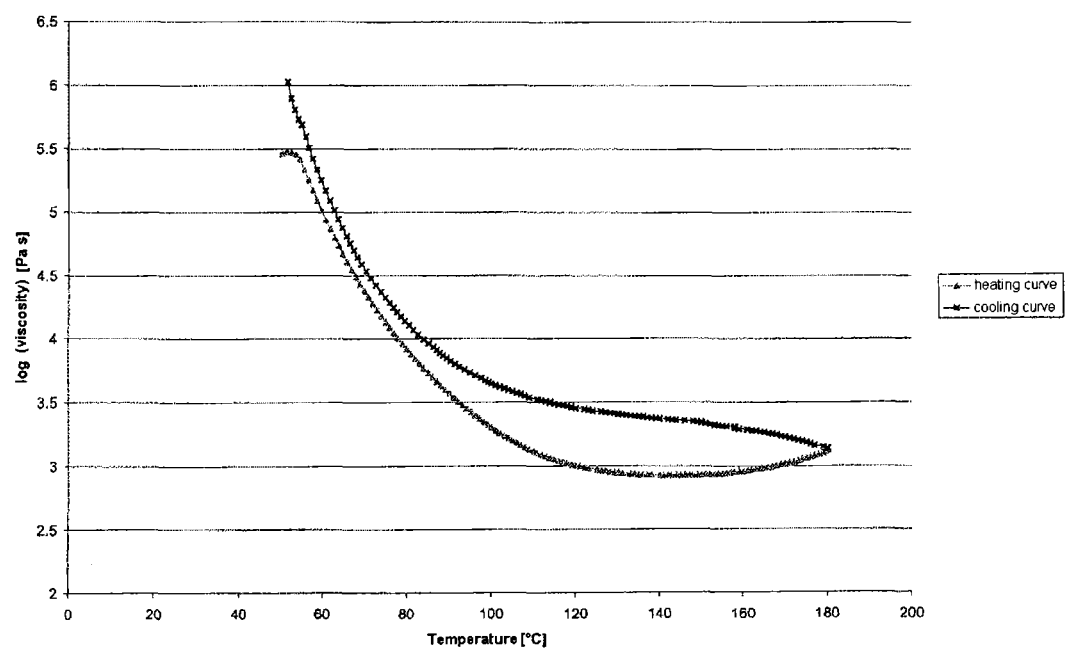

MATERIALS HAVING A CONTROLLABLE DEGREE OF CROSSLINKING

CROSS REFERENCE TO RELATED APPLICATION

This application is a 371 of PCT/EP2011/067752, filed on Oct. 12, 2011, and claims priority to German Application No. 10 2010 044 025.6, filed on Nov. 17, 2010.

The present invention relates to innovative materials which can be crosslinked by means of two different crosslinking mechanisms, the first crosslinking mechanism being an irreversible crosslinking. The second crosslinking mechanism is a thermoreversible mechanism.

As a result of this thermoreversible change in the arc length, properties of the crosslinked material can be decisively changed and controlled, including flexibility, elasticity and other mechanical properties, but also chemical properties, the gas permeability and vapour permeability and storage capacity of the network. In this way it would be possible, for example, to store energy sources such as fuels.

PRIOR ART

Methods for the reversible crosslinking of polymers are of great interest for a broad field of applications. In adhesive applications, for example, diverse possibilities for the automotive industry or the semiconductors industry are described. In the context of the construction of machines, precision mechanical devices, or in the building industry as well, however, such adhesives are of interest. Besides adhesive applications, reversible crosslinkable polymers may also be of interest in sealants, in coating materials such as varnishes or paints, or in the production of mouldings.

To date, however, there has been no description of a technically useful system with which a permanently crosslinked system can be switched in terms of its properties, as for example between an elastomeric state and a thermoset state.

DE 198 32 629 and DE 199 61 940 describe processes where epoxy-, urea-, (meth)acrylates- or isocyanate-based adhesives are thermally decomposed. For this purpose, the adhesive formulation from DE 199 61 940 comprises a thermally unstable substance which is activated on heating. The adhesive layer in DE 198 32 629 is destroyed by a particularly high energy input. In both cases, deactivation of the adhesive layer is irreversible.

US 2005/0159521 and US 2009/0090461 describe an adhesive system which is crosslinked radically by exposure to actinic radiation and is destroyed by ultrasound. This process too, irreversibly, can no longer be implemented after one bonding cycle.

In EP 2 062 926, thermally labile sterically hindered urea groups are incorporated into the chains of a polyurethane for adhesive applications; introduction of thermal energy causes destruction of the groups, thereby reducing the adhesive bonding effect sufficiently to part the bond.

US 2009/0280330 describes an adhesive system which can apparently be used more than once and which has a two-layer construction. One layer is a shape memory layer, which may be thermally flexible or cured. The other layer is a dry adhesive, having different adhesive strengths as a function of its structure. Problems of such a system, however, are two-layer structure, which is laborious to construct, and the anticipated residual tack after heating of the shape memory layer.

For a number of years, primarily within academia, methods for constructing block copolymers have been researched under the generic heading of "click chemistry". In this chemistry, two different homopolymers with linkable end groups are combined with one another and are joined to one another by means, for example, of a Diels-Alder reaction, Diels-Alder-analogous reaction or other cycloaddition. The objective of this reaction is to construct thermally stable, linear and possibly high molecular mass polymer chains. Inglis et al. (Macromolecules 2010, 43, pp. 33-36), for example, describe for this purpose polymers with cyclopentadienyl end groups which are obtainable from polymers prepared by means of ATRP. These cyclopentadiene groups are able to react very rapidly in hetero-Diels-Alder reactions with polymers which carry electron-deficient dithioesters as end groups (Inglis et al., Angew. Chem. Int. Ed. 2009, 48, pp. 2411-2414).

The use of monofunctional RAFT polymers for linking with monofunctional polymers having a dihydrothiopyran group by way of a hetero-Diels-Alder reaction is found in Sinnwell et al. (Chem. Comm. 2008, 2052-2054). This method can be used to realize AB diblock copolymers. Rapid variants of this hetero-Diels-Alder linkage for the synthesis of AB block copolymers with a dithioester group which is present after a RAFT polymerization and with a dienyl end group are described in Inglis et al. (Angew. Chem. Int. Ed. 2009, 48, pp. 2411-14) and in Inglis et al. (Macromol. Rapid Commun. 2009, 30, pp. 1792-98). The analogous preparation of multiarm star polymers is found in Sinnwell et al. (J. Pol. Sci.: Part A: Pol. Chem. 2009, 47, pp. 2207-13).

U.S. Pat. No. 6,933,361 described a system for producing transparent mouldings that can be repaired easily. The system is composed of two polyfunctional monomers which polymerize by means of a Diels-Alder reaction to form a highly dense network. One functionality in this system is a maleimide and the other functionality is a furan. The thermal switching of a high-density network of this kind is used for its repair. Crosslinking takes place at temperatures above 100° C., the partial reverse reaction at even higher temperatures.

In Syrett et al. (Polym. Chem. 2010, DOI: 10.1039/b9py00316a) star polymers are described for use as flow improvers in oils. These polymers have self-healing properties that can be controlled by means of a reversible Diels-Alder reaction. For this purpose, monofunctional polymethacrylate arms are combined with polymethacrylates which in the middle of the chain, as a fragment of the initiator used, possess a group which can be used in a reversible Diels-Alder reaction.

The patent application with the number 102010001987.9, filed at the German Patent and Trademark Office on 16 Feb. 2010, discloses crosslinkable systems which feature a thermoreversible crosslinking mechanism based on a Diels-Alder or hetero-Diels-Alder reaction. German patent application 102010001992.5, filed on the same date, discloses analogous systems which have a controllable viscosity by means of the same thermoreversible mechanism. Both patent applications are confined primarily to systems in which the dienophile has a carbon-sulphur double bond. In both cases, moreover, the systems described only contain at least one polymeric component deriving from a controlled radical polymerization.

Object

An object of the present invention is to provide new materials which can be switched in relation to mechanical properties such as various elastomeric and/or thermoset states.

A particular object is to provide a reversible crosslinking method which can be switched a number of times, i.e. at least five times, between the two states, without substantial loss of properties.

Furthermore, the object exists of being able to activate this switching very rapidly at low temperatures and to be able to deactivate it again under conditions which are benign for the formulation and for any coated substrates.

Further objects, not stated explicitly, will become apparent from the overall context of the description, claims and examples hereinbelow.

Solution

The objects have been achieved through the combination of two crosslinking mechanisms, at least one of which is a reversible crosslinking mechanism which can be used for different kinds of polymers irrespective of the formulating ingredients such as binders. With this mechanism, new formulations which can be switched reversibly in terms of degree of crosslinking are also provided. Surprisingly it has been found that the stated objects can be achieved by means of a formulation which can be switched by means of a combination of a Diels-Alder or hetero-Diels-Alder reaction and of a second, independent crosslinking mechanism.

The objects are achieved more particularly by the provision of an innovative, partially reversibly crosslinkable formulation which is characterized in that the formulation is crosslinkable by means of two different mechanisms A and B.

Through the Diels-Alder or hetero-Diels-Alder reaction of a diene with a dienophile it is possible, for example, to achieve a specific increase in the crosslinking density of the material below the retro-Diels-Alder temperature. Accordingly, for example, it is possible to achieve switching between an elastomeric state of the material and a thermoset state of the material.

Mechanism A is a Diels-Alder or hetero-Diels-Alder reaction which can be activated at an activation temperature $T_1$, which is preferably room temperature. The crosslinking formed in this case may be reversed at a higher temperature $T_3$ to an extent of at least 50%. At the same time, in accordance with the invention, mechanism B does not meet this combination of conditions. In other words, mechanism B either can be activated at a temperature $T_2$ which is higher than the activation temperature $T_1$, and/or the crosslinking cannot be reversed and/or the temperature $T_4$ at which the crosslinking is reversed is higher than the temperature $T_3$ at which the crosslinking according to mechanism A is reversed. Room temperature is understood in the context of this invention to refer to a temperature of 20° C.

Crosslinking mechanism B may comprise any known crosslinking mechanism. These mechanisms are to be selected in each case for the specific system and/or application. The mechanisms suitable for this purpose, and formulations needed for them, are known to the skilled person and can be consulted in appropriate text books.

In the context of this invention, a distinction is made for these purposes between three kinds of crosslinking mechanism: irreversible chemical crosslinking, reversible chemical crosslinking, and reversible physical crosslinking.

The irreversible chemical crosslinking mechanisms may be, for example and preferably, a condensation mechanism or addition mechanism involving formation of cross links which have an ester, amide or epoxy functionality. In the case of moisture-crosslinking mechanisms, the crosslinking systems in question are silyl-based or isocyanate-based systems. Examples of such would include the crosslinking of di- or trimethoxysilyl groups with moisture, or the crosslinking reaction of polyols with isocyanates.

Another group of irreversible chemical crosslinking mechanisms is represented by the radical crosslinkings.

These may be activated by means of radiation, such as UV radiation, thermally, or by formulation with initiators. These systems may additionally, optionally, comprise accelerants.

A third group is represented by vulcanization. In this case, compounds suitable for the purpose, generally compounds containing sulphur or containing thiol groups, are added on to carbon-carbon double bonds. Another possible additive crosslinking reaction is the ene reaction, as is known from crosslinking with dicyclopentadiene groups.

In the case of reversible physical crosslinking, there are again different kinds of crosslinking known. The most important representatives are ionic crosslinkings or crosslinkings by means of crystallization of the kind that are known for thermoplastic elastomers, as in the case of certain polyolefins, for example.

In one particular embodiment of the present invention, the crosslinking mechanism B is also a reversible chemical crosslinking mechanism as for mechanism A. The mechanism preferably is, so to speak, a reversibly switchable Diels-Alder or hetero-Diels-Alder reaction. It is important that in this case the crosslinking temperature $T_2$ is at least 20° C., preferably at least 40° C., above the crosslinking temperature $T_1$ of the crosslinking mechanism A, and/or that the deactivation temperature $T_4$ is at least 20° C., preferably at least 40° C., higher than the deactivation temperature $T_3$ of the mechanism A.

The formulation of the invention comprises at least one component A, which has at least two dienophilic double bonds, and a component B, which has at least two diene functionalities. At least one of these two components, A or B, has more than two functionalities. Components A and B are the components required for crosslinking mechanism A.

The second, only optionally reversible crosslinking reaction takes place by means of the components C and optionally D. These components comprise the functionalities needed for crosslinking by means of crosslinking mechanism B. In the case of systems which contain only one component C, mention may be made, for example, of UV-crosslinking systems or else silyl-crosslinking systems. In the case of systems which also contain a component D, the systems in question may, for example, be polyols for component C and, for component D, compounds which contain isocyanate groups. For reversible crosslinking mechanisms A and B, there could, accordingly, be at least two dienophiles, different from A, for component C, and, for component D, compounds which have at least two diene functionalities different from B.

There are further possible alternative compositions. Thus, for example, component C may be identical to component A or to component B. In such a case, for example, component A is a compound which at the same time has at least two dienophilic double bonds and has the functionalities of component C that are needed for crosslinking reaction B. Alternatively, in an analogous sense, component C may also be identical to component B. It is also possible for component D to be identical analogously to one of the two components, or for components A and C and components B and D in each case to be identical compounds in this sense. The converse case to this as well, where A and D are identical and B and C are identical, is also conceivable.

Further embodiments arise when the system possesses two reversible crosslinking mechanisms A and B. In this case, in addition to the examples already set out with the components A, B, C and D, in other words with four different functional groups, there may also be a variant composed of three components A, B and C with three different functional groups. In this case, either one kind of dienophile reacts with two different dienes, or else two different dienophiles are present together with just one kind of diene. It is important here that the functional group which is present only once is present in a sufficient amount to allow reaction with both species of the complementary functionality.

A further aspect of the present invention is the presence of at least one of the components A, B, C and D in the form of polymer. Preferably at least one of the components A or B is present in the form of a polymer. Particularly preferred are systems in which at least two of the components A, B and C are present in the form of polymer.

Looking only at components A and B produces the following compositions, set out by way of example. For C and optionally D, corresponding freely selectable compositions made up of low molecular mass compounds, oligomers or polymers may apply:

In one alternative embodiment, the component having at least three functionalities is an oligomer or is a low molecular mass substance, and the component having two functionalities is a polymer. In a third alternative embodiment, both components are polymers. In further alternative embodiments, both components have at least three functionalities, irrespective of which of the two components is a polymer. In another embodiment, both components are polymers having at least three functionalities.

With very particular preference, components A and B, especially A, B and C, and optionally even A, B, C and D, are in each case a polymer. In this case, these polymers, apart from the functional groups needed for crosslinking, may be identical or different polymers.

These polymers may be polyacrylates, polymethacrylates, polystyrenes, copolymers of acrylates, methacrylates and/or styrenes, polyacrylonitrile, polyethers, polyesters, polylactic acids, polyamides, polyesteramides, polyurethanes, polycarbonates, amorphous or partially crystalline poly-α-olefins, EPDM, EPM, hydrogenated or unhydrogenated polybutadienes, ABS, SBR, polysiloxanes and/or block, comb and/or star copolymers of these polymers.

These star polymers may have more than 30 arms. The composition of the arms may vary and may be composed of different polymers. These arms in turn may also have branches. The comb polymers may have a block structure and also variable comb arms.

The (meth)acrylates notation used below stands for alkyl esters of acrylic acid and/or of methacrylic acid.

A particular aspect of the invention is that the formulation according to crosslinking mechanism A can be crosslinked at room temperature, and this crosslinking can be reversed to an extent of at least 50% at a higher temperature. Accordingly, the formulation can be switched, by means of crosslinking mechanism A, between an elastomeric state and a thermoset state or an elastomeric state which is less strongly pronounced. The properties of the less strongly pronounced elastomeric state are determined by the degree of crosslinking according to the mechanism B. The latter mechanism is easily selectable by the skilled person, who is able to adjust it in a specific way, thereby producing a further advantage of the present invention, in the form of a broad possibility for variation.

Where both crosslinking mechanisms are reversible, switching may take place between a thermoset, or less elastomeric, state, an elastomeric state, and a thermoplastic state.

In a further variant which is conceivable, though not in accordance with the invention, mechanism B is not a crosslinking mechanism but is instead a mechanism for the specific control of the viscosity, as disclosed in German patent application DE 102010001992.5. In that case, the components A and B each have only one or two functional groups.

In such a system, therefore, switching takes place between a thermoset or elastomeric state—depending on degree of crosslinking by mechanism A—and two thermoplastic states, having different melt viscosities and solution viscosities.

Correspondingly, in a further variant which is likewise not inventive, and which also configures crosslinking mechanism A in accordance with DE 102010001992.5, switching may take place between three different thermoplastic states having different viscosities. A variant of this kind may also be combined, furthermore, with further mechanisms involving crosslinking or an increase in viscosity.

In one particularly rapid variant, the dienophile is a compound having a carbon-sulphur double bond, and hence the preferred crosslinking reaction is a hetero-Diels-Alder reaction. With particular preference the dienophile is a dithioester. With very particular preference the dienophile is a compound having the structure

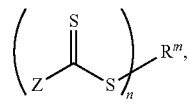

where Z is a strongly electron-withdrawing group, $R^m$ is a polyvalent organic group, preferably based on branched or linear alkylic, aromatic or a combination of alkylic and aromatic polyfunctional alcohols, polyfunctional halogenated compounds, polyfunctional carboxylic acids or polyfunctional amines. Alternatively $R^m$ may also be a polymer. The number of dithioester groups, n, is a number between 2 and 20, preferably between 2 and 10 and more preferably between 2 and 4.

In one preferred embodiment the group Z is a 2-pyridyl group, a phosphoryl group or a sulphonyl group. Additionally contemplated are cyano or trifluoromethyl groups and also any other group Z which very strongly reduces the electron density of the C=S double bond and hence permits a rapid Diels-Alder reaction.

These systems are able to crosslink very rapidly even at room temperature, with optional addition of a crosslinking catalyst. Equally surprisingly it has been found that these networks can be returned into a thermoplastic again, simply and almost completely even at very low temperatures of, for example, somewhat over 80° C. It has also been found, very surprisingly, that further crosslinking can take place thereafter, without further addition of crosslinker and/or catalyst, as for example by means of pure cooling. Furthermore, it is a particularly surprising effect that these cycles of crosslinking and conversion back into a thermoplastic can be carried out at least three times, preferably at least five times, without substantial loss of properties of the network.

In one possible embodiment, component B is a difunctional polymer which is prepared by means of atom transfer radical polymerization (ATRP). In this case, functionalization with the diene groups takes place by means of a polymer-analogous substitution, or one carried out during termination, of terminal halogen atoms. This substitution may take place, for example, by addition of mercaptans functionalized with diene groups.

In the same possible embodiment it is possible as component A to use a low molecular mass organic compound having 3 to 4 dithioester groups, and having, in accordance with the above embodiment, a group Z which strongly reduces the electron density of the C=S double bond.

A further aspect of the present invention is the process for dual crosslinking, particularly for reversible crosslinking with crosslinking mechanism A. When this process is implemented, a formulation composed of at least two different components A and B is crosslinked preferably at room temperature by means of a Diels-Alder or hetero-Diels-Alder reaction. Overall, the process of the invention consists of at least three steps:

After the components have been mixed, in a first crosslinking step, the composition of the invention is crosslinked by means of above-described mechanism B. This may be done at the temperature suitable for this purpose, which is preferably room temperature. The crosslinking may also be initiated largely independently of the temperature, via a radical mechanism, for example by irradiation with UV light.

In a second crosslinking step, by means of mechanism A, which is a Diels-Alder or hetero-Diels-Alder reaction, the same composition is crosslinked additionally at room temperature. The two crosslinking steps by mechanism A and B may in this case take place simultaneously or in any desired order with respect to one another. Preferably, both crosslinking steps take place simultaneously.

The crosslinking by means of mechanism A takes place preferably after the mixing of the components A and B within 2 minutes.

In an equally preferred embodiment, the crosslinking by means of mechanism A takes place after the mixing of components A and B with a crosslinking catalyst within 2 minutes.

In an optional third process step, at a higher temperature, at least 50%, preferably at least 90% and more preferably at least 99% of the crosslinks formed by mechanism A are undone by means of a retro-Diels-Alder or retro-hetero-Diels-Alder reaction. When this third process step is implemented, at least 90% by weight, preferably at least 95% by weight and more preferably at least 98% by weight of the crosslinks formed by mechanism A are undone at a temperature above 80° C., preferably within 5 minutes, at most within 10 minutes.

In a variant of the invention which is already being set out, the crosslinking by means of mechanism B is also a reversible crosslinking by means of a Diels-Alder or hetero-Diels-Alder reaction. In this case, this crosslinking may be undone at a temperature which is at least 40° C. above the undo temperature of the crosslinking by mechanism A, by means of a retro-Diels-Alder or retro-hetero-Diels-Alder reaction.

When this variant is implemented, at a temperature of 140° C., preferably within 5 minutes, at least 90% of the formulation becomes soluble again, preferably, in a solvent suitable for the formulation prior to crosslinking.

The expression "formulation" for the purposes of this specification describes exclusively the components A, B and C and the optional component D and also an optional crosslinking catalyst. The expression "composition", in contrast, encompasses not only the formulation but also added components as well. Further composition ingredients of the kind that may be added, for example, in a coating composition or adhesive composition are not considered in the term "formulation". These additional components may be adjuvants selected specifically for the particular application, such as, for example, fillers, pigments, additives, compatibilizers, co-binders, plasticizers, impact modifiers, thickeners, defoamers, dispersing additives, rheology improvers, adhesion promoters, scratch resistance additives, catalysts or stabilizers.

In accordance with the formulation already described, first components A, B, C and optionally D, and optional further adjuvants, are first combined in the process. The components A and/or B and/or C, and D, comprise at least one polymer from the list given earlier on above.

The reversible crosslinking reaction A may take place at room temperature within 10 minutes, preferably within 5 minutes, more preferably within 2 minutes and very preferably within one minute. In order to accelerate the crosslinking it is possible to add a crosslinking catalyst after components A and B have been mixed. These crosslinking catalysts are generally strong acids such as trifluoroacetic acid or sulphuric acid, or strong Lewis acids such as boron trifluoride, zinc dichloride, titanium dichloride diisopropoxide or aluminium trichloride, for example.

In an alternative embodiment, the reversible crosslinking may also be accelerated without a catalyst, by thermal means, for example. In that case the activation temperature is below the temperature needed for the retro-(hetero)-Diels-Alder reaction.

In another alternative embodiment, the formulation, independently of the activation of the reversible crosslinking reaction, comprises a further catalyst that lowers the activation temperature of the retro-Diels-Alder or retro-hetero-Diels-Alder reaction. These catalysts may be, for example, iron or an iron compound.

The formulations and processes of the invention may be employed in a very wide variety of fields of application. The list below indicates certain preferred fields of application by way of example, without confining the invention in this respect in any form whatsoever. Such preferred fields of application are membranes, adhesives, sealants, moulding compounds, varnishes, paint, coatings, composite materials or inks.

Examples of applications in the rapid prototyping field for the crosslinking and de-crosslinking materials described herein can be found in the sectors of FDM (fused deposition modelling) or in 3D printing by the inkjet process with low-viscosity melts.

Examples on the functioning and on the implementation of the reversible crosslinking mechanism A, and in the alternative embodiment B, may be consulted in patent applications DE 102010001987.9, DE 102010001992.5 and DE 102010040282.6.

EXAMPLES

Precursor 1 Synthesis of Br-Functional Poly(nBA-co-iBoA)

a) 20 equivalents of n-butyl acrylate (nBA), 20 equivalents of isobornyl acrylate (iBoA), 1 equivalent of 1,4-bis(bromoisobutyryloxy)butane, 0.105 equivalent of copper(I) bromide, 0.0125 equivalent of copper(II) bromide and 0.25 equivalent of 2,2'-bipyridine are placed in a 1 l three-necked flask with magnetic stirrer, nitrogen feed line and reflux condenser. Acetone is added to the mixture in an amount sufficient to give 500 ml of a 50% strength by volume solution. Oxygen present is removed by passing nitrogen through the solution for 40 minutes. The mixture is then heated to 60° C. in an oil bath under nitrogen. Polymerization is terminated after 3 hours by cooling to room temperature and admission of atmospheric oxygen. The copper catalyst is removed by electrochemical deposition on zinc dust. The bromine-terminated poly(n-butylacrylate) is obtained by evaporation of the solvent. The molecular weight is determined by means of GPC with calibration against PMMA standards in THF: $M_n$=4300 g·mol$^{-1}$, PDI=1.2.

Precursor 2 Synthesis of Cp-Functional
Poly(nBA-co-iBoA)

1 equivalent of polymer from precursor 1, 6 equivalents of sodium iodide, 2 equivalents of triphenylphosphine and 2 equivalents of nickelocene are stirred in acetone in a 50 ml three-necked flask with magnetic stirrer, reflux condenser and dropping funnel under nitrogen. 25 ml of a solution are formed which is 0.1 molar with respect to the polymer. The solution is stirred at room temperature for 12 hours, and then the reaction solution is purified by column chromatography on a short column packed with basic aluminium oxide. The cyclopentadienyl-terminated polymer is precipitated twice from cold ethanol by addition of water. The reaction of the Br end groups to form Cp end groups can be demonstrated by means of NMR spectroscopy. NMR spectroscopy showed 3.2 mol % of Cp groups in the copolymer.

Precursor 3 Synthesis of
Poly(BuMA-co-MMA-co-HEMA-maleate)

For the synthesis of the copolymer, a mixture of 56 parts by weight of n-butyl methacrylate, 24 parts of methyl methacrylate and 20 parts by weight of HEMA maleate (hydroxyethyl methacrylate maleate) are dissolved in 35 parts by weight of xylene in a glass vessel, 4 parts by weight of mercaptoethanol are added, and the mixture is degassed by the passage of nitrogen through it. In a further vessel, a 10% strength by weight solution of α,α'-azobis(N-2-hydroxyethylisobutiramide) (3 parts by weight) is prepared. The two initial charges are meted in a constant proportion over a period of five hours, under nitrogen, into a jacketed glass reactor heated to 110° C. and fitted with a thermostat, and allowed to polymerize. After the end of the metered addition, heating is continued at 110° C. for a further hour, and the resultant polymer solution is cooled and discharged. A viscous, clear polymer solution is obtained. The molecular weight is determined by GPC with calibration against PMMA standards in THF, with addition of 1% by weight of TFA: $M_n$=5400 g·mol$^{-1}$, PDI=2.6. NMR spectroscopy indicated 3.7 mol % of HEMA maleate in the copolymer.

Example 1

20 parts by weight of precursor 2 are admixed with 15 parts by weight of precursor 3 (0.75 equivalent with respect to Cp groups), 50 parts by weight of acetone and one part by weight of $ZnCl_2$, and the mixture is stirred at room temperature for 2 hours. The sample is thereafter poured into an aluminium tray and dried (overnight) in a vacuum oven at 50° C. The tough and elastic mass was subjected to dynamic mechanical analysis and characterized over a temperature range between 50 and 180° C. by means of plate/plate viscosity (see FIG. 1). DSC indicated a glass transition temperature for the mass of −6° C.

It is evident that the material has a softening point at around 55° C., at which some of the Diels-Alder bridges formed between Cp groups and maleic ester are broken. The Cp-Cp compounds which originate from the excess of the Cp groups and which are not reversible under the measurement conditions are retained as crosslinkers. This non-reversible crosslinking is therefore a second Diels-Alder mechanism.

The invention claimed is:

1. A partially reversibly crosslinkable formulation which is crosslinkable by:
   (A) a Diels-Alder reaction or a hetero-Diels-Alder reaction, said reactions activated at room temperature such that crosslinking is reversible to an extent of at least 50% at a higher temperature; and
   (B) a crosslinking reaction different than the Diel-Alder reactions (A),
   the crosslinkable formulation comprising:
   a component A comprising at least two dienophilic double bonds;
   a component B comprising at least two diene functionalities; and
   a component C and an optional component D which are activated by the crosslinking reaction (B),
   wherein:
   at least one of the component A and the component B comprises more than two functionalities one of the component C and the optional component D is identical to one of the component A or the component B, or each of the component C and the optional component D are different from each of the component A and the component B;
   at least one of the components A, B, or both is a polymer; and
   the crosslinking (B) is a reversible switchable Diels-Alder or hetero-Diels-Alder reaction, and a crosslinking temperature and/or a deactivation temperature is higher by at least 40° C. than for the Diels-Alder reaction or hetero-Diels-Alder reaction of the crosslinking (A).

2. The formulation according to claim 1, wherein the crosslinking (B) is an ester-, amide-, epoxy-, silyl- or isocyanate-based crosslinking.

3. The formulation according to claim 1, wherein the crosslinking (B) is a UV-initiated, thermally initiated or initiator-initiated radical crosslinking or vulcanization.

4. The formulation according to claim 1, wherein the crosslinking (B) is a physical crosslinking.

5. The formulation according to claim 1, wherein each of the component A and the component B are polymers, where the polymers thereof are identical or different.

6. The formulation according to claim 1, wherein the polymer of the component A, B, or both is a polymer selected from the group consisting of a polyacrylate, a polymethacrylate, a polystyrene, a copolymer of acrylates, methacrylates and/or styrenes, polyacrylonitrile, a polyether, a polyester, a polylactic acid, a polyamide, a polyester amide, a polyurethane, a polycarbonate, an amorphous or partially crystalline poly-α-olefin, EPDM, EPM, a hydrogenated or unhydrogenated polybutadiene, ABS, SBR, a polysiloxane, and a block, comb and/or copolymer of these polymers.

7. A process for partial reversible crosslinking, the process comprising crosslinking a formulation comprising at least three of different components A, B, C and optionally D such that:
   (i) a crosslinking reaction (i) of the component C and optionally the component D occurs by a mechanism B;
   (ii) a crosslinking reaction (ii) occurs at room temperature by a mechanism A, wherein the components A and B react by a Diels-Alder reaction or a hetero-Diels-Alder reaction; and
   (iii) optionally, at least 50% of crosslinks are undone by a retro-Diels-Alder reaction or a retro-hetero-Diels-Alder reaction,
   wherein:
   the crosslinking (i) and the crosslinking (ii) occur simultaneously or in any order relative to one another;
   and the formulation is the formulation according to claim 1.

8. The process according to claim 7, wherein the crosslinking (i) and the crosslinking (ii) occur simultaneously.

9. The process according to claim 7, wherein at least 90% of the formulation is soluble in a solvent prior to crosslinking, at a temperature above 140° C.

10. The process according to claim 7, wherein each polymer for the component A, B, or both is at least one polymer selected from the group consisting of a polyacrylate, a polymethacrylate, a polystyrene, a copolymer of acrylates, methacrylates and/or styrenes, polyacrylonitrile, a polyether, a polyester, a polylactic acid, a polyamide, a polyester amide, a polyurethane, a polycarbonate, an amorphous or partially crystalline poly-α-olefin, EPDM, EPM, a hydrogenated or unhydrogenated polybutadiene, ABS, SBR, a polysiloxane, and a block, comb and/or copolymer of these polymers.

11. The process according to claim 7, wherein the crosslinking (ii) by the mechanism A occurs within 2 minutes after mixing the components A and B.

12. The process according to claim 7, wherein the crosslinking (ii) by the mechanism A occurs within 2 minutes after mixing the components A and B with a crosslinking catalyst.

13. An article comprising the formulation according to claim 1, said article selected from the group consisting of a membrane, an adhesive, a sealant, a mounding compound, a varnish, a paint, a coating, and ink and a composite material.

* * * * *